No. 607,134. Patented July 12, 1898.
R. F. RIGHTMIRE.
DISH CLEANER.
(Application filed Feb. 9, 1898.)
(No Model.)
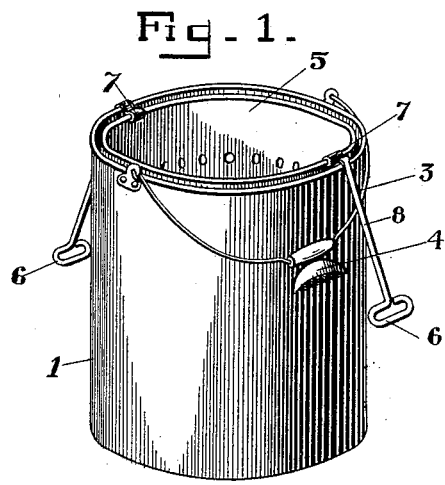
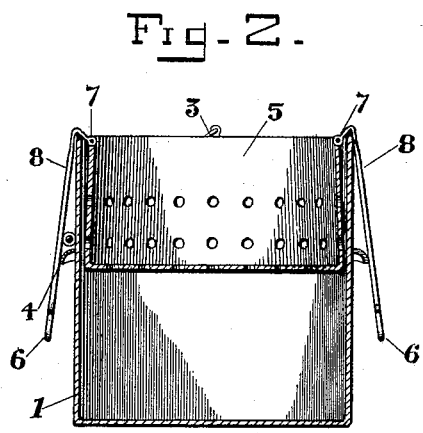
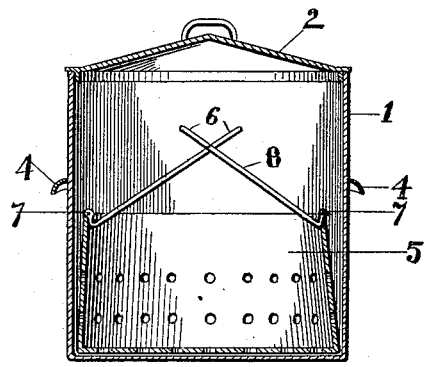
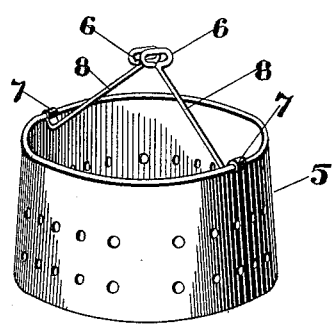
Witnesses
L. R. Medcalf
J. F. Riley
Inventor
Raymond F. Rightmire
By his Attorneys,
C. A. Snow & Co.

UNITED STATES PATENT OFFICE.

RAYMOND F. RIGHTMIRE, OF PARSONS, WEST VIRGINIA.

DISH-CLEANER.

SPECIFICATION forming part of Letters Patent No. 607,134, dated July 12, 1898.

Application filed February 9, 1898. Serial No. 669,704. (No model.)

*To all whom it may concern:*

Be it known that I, RAYMOND F. RIGHTMIRE, a citizen of the United States, residing at Parsons, in the county of Tucker and State of West Virginia, have invented a new and useful Dish-Washer, of which the following is a specification.

The invention relates to improvements in dish-washers.

The object of the present invention is to improve the construction of dish-washers and to provide a simple, inexpensive, and efficient one which will enable dishes to be thoroughly washed and dried without liability of the hands of the operator coming in contact with the dish-water.

The invention consists in the construction and novel combination and arrangement of parts, as hereinafter fully described, illustrated in the accompanying drawings, and pointed out in the claim hereto appended.

In the drawings, Figure 1 is a perspective view of a dish-washer constructed in accordance with this invention, the holder or tray being elevated. Fig. 2 is a vertical sectional view of the same. Fig. 3 is a similar view, the holder or tray being arranged in its lowermost position. Fig. 4 is a perspective view of the holder or tray.

Like numerals of reference designate corresponding parts in the several figures of the drawings.

1 designates a cylindrical outer vessel or boiler having a cover 2 and provided with a swinging bail 3 and rigid handles 4, and the outer vessel or boiler, which is adapted to be placed upon a stove or other heating apparatus for raising the water to the proper temperature, receives a cylindrical tray or holder 5, which is perforated at its sides and bottom and which is adapted to receive the dishes to be washed. The tray or holder, which is provided with handles 6, is adapted to be reciprocated vertically within the outer vessel or boiler, and in order to produce a thorough agitation of the contents of the latter and to effect a pumping action the holder or tray has its sides tapering from its bottom to its top. The bottom of the holder or tray is substantially the same diameter as the inner face of the outer vessel or boiler and the holder or tray is of a less diameter at its top, as clearly illustrated in Figs. 2 and 3 of the accompanying drawings. This construction enables the liquid contents of the dish-washer to be forced among the dishes and the latter are rapidly and thoroughly washed.

The handles 6 consist of loops and shanks which are hinged at 7 to the upper edges of the tray or holder, at opposite sides thereof, and they have their inner terminals bent at an angle to form arms 8, which, as illustrated in Figs. 1 and 2 of the accompanying drawings, are adapted to engage the upper edges of the outer vessel or boiler to support the tray or holder in an elevated position above the liquid contents of the outer vessel or boiler, so that the dishes after being washed may thoroughly drain and dry. The weight of the handles 6 maintains the holder or tray in an elevated position and they are adapted to be readily swung outward to the position shown in Figs. 1 and 2.

The arms 8, as clearly shown in Figs. 3 and 4 of the accompanying drawings, are adapted to engage the inner face of the tray or holder and support the handles in an elevated position within convenient reach.

The invention has the following advantages: The dish-washer, which is simple and comparatively inexpensive in construction, is strong and durable, and the arms, which are adapted to engage the upper edge of the boiler or vessel to support the tray or holder in an elevated position, are capable of engaging the inner face of the same to hold the handles in an elevated position, so that they will be in convenient reach.

What I claim is—

A dish-washer, comprising an outer vessel or boiler, a tray or holder, arranged within the same, and the oppositely-disposed handles hinged to the tray or holder at the upper edges thereof and provided at their inner ends with bends forming angularly-disposed arms adapted to engage the upper edge of the outer vessel when the handles are swung outward, whereby the tray or holder is supported in an elevated position, said arms being also adapted to engage the inner face of the tray or holder to support the handles in an elevated position within the outer vessel or boiler, substantially as described.

In testimony that I claim the foregoing as my own I have hereto affixed my signature in the presence of two witnesses.

RAYMOND F. RIGHTMIRE.

Witnesses:
W. T. LEUCH,
J. NEWMAN.